L. E. LEMLEY.
RESILIENT WHEEL FOR VEHICLES.
APPLICATION FILED MAR. 17, 1920.

1,436,178.

Patented Nov. 21, 1922.
2 SHEETS—SHEET 1.

WITNESSES
E. C. Duffy
F. T. Chapman.

INVENTOR
Louis E. Lemley
BY
ATTORNEY

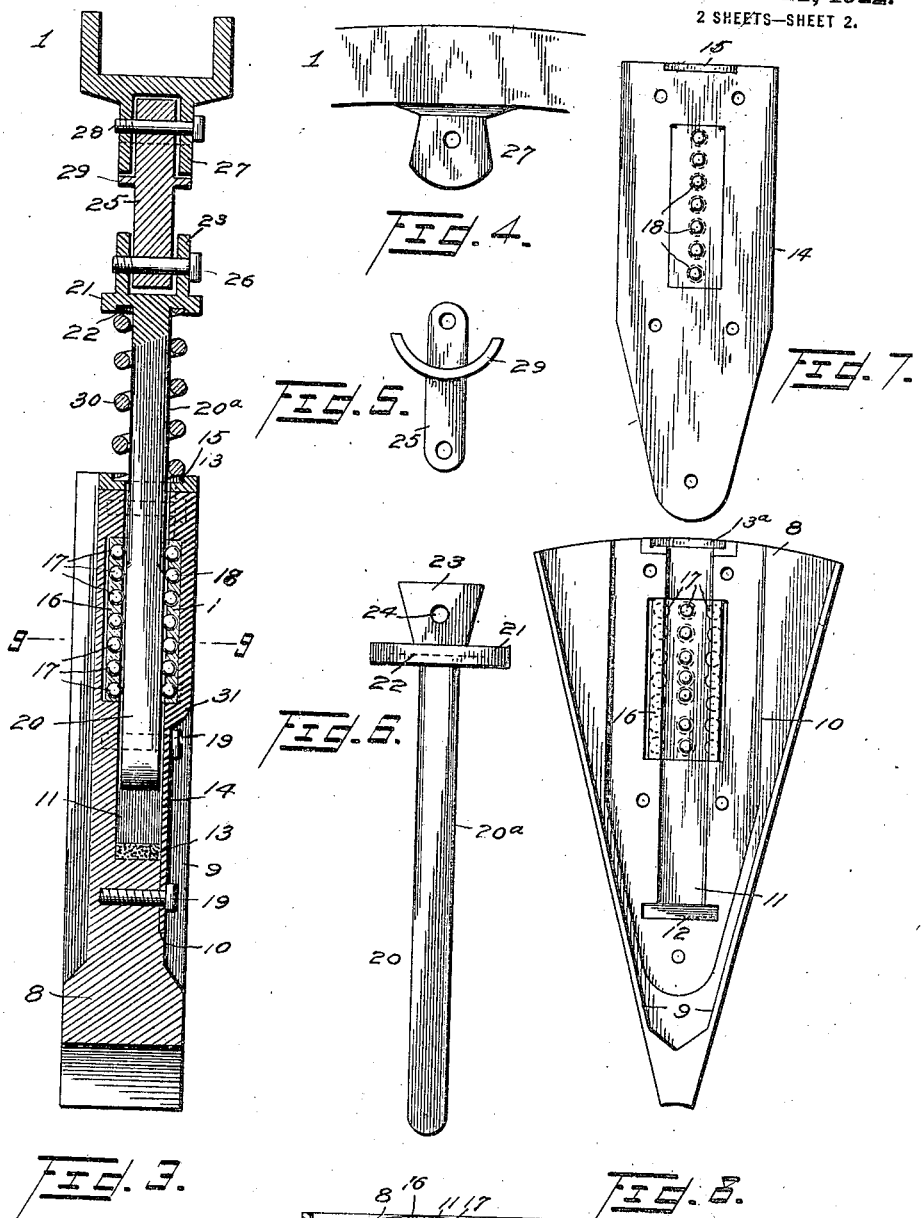

Patented Nov. 21, 1922.

1,436,178

UNITED STATES PATENT OFFICE.

LOUIS EDWARD LEMLEY, OF NEW ORLEANS, LOUISIANA.

RESILIENT WHEEL FOR VEHICLES.

Application filed March 17, 1920. Serial No. 366,549.

*To all whom it may concern:*

Be it known that I, LOUIS E. LEMLEY, a citizen of the United States, residing at New Orleans, in the parish of Orleans and State of Louisiana, have invented a new and useful Resilient Wheel for Vehicles, of which the following is a specification.

This invention has reference to resilient or spring wheels for vehicles, and its object is to provide an elastically yieldable or spring wheel obviating the use of pneumatic tires on automobile and other wheels.

In accordance with the invention, an extensible and contractible rim or tire is provided, and pivotally connected to the tire is a series of spokes entering and slidable in a generally radial direction in a central or hub portion, with the spokes constrained by springs so that the central portion may yield with respect to the rim portion in the event of the rim portion meeting irregularities or obstructions. The spokes are joined to the rim by link connections permitting relative displacement of the spokes and rim, but this displacement is resisted by springs so that no direct shocks or jars are transmitted to the vehicle carried by the wheels.

The invention contemplates a rigid resistant construction so far as the mechanical details of the wheel are concerned, and since parts of the wheel slide upon other parts, provision is made for reducing frictional losses to a minimum.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Fig. 3 is a section longitudinally of one of the spokes taken at right angles to the showing of Fig. 1 and drawn on a larger scale.

Figs. 4, 5 and 6 are separate views of the elements of one of the spokes moved apart in the direction of the length of the spoke.

Figs. 7 and 8 are views of separate parts of a spoke socket at the hub portion of the wheel.

Fig. 9 is a section on the line 9—9 of Fig. 3.

Figure 1:
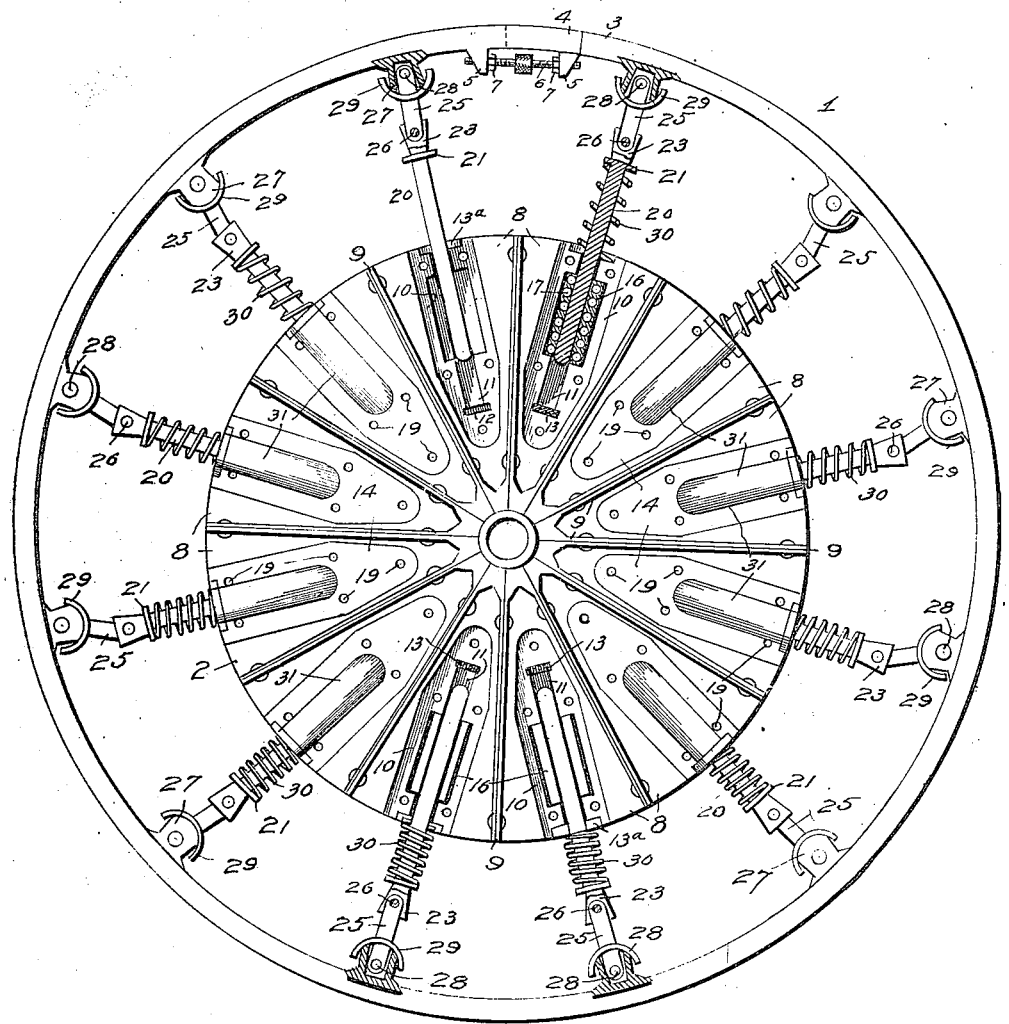
Fig. 1 is an elevation of the wheel with some parts in section and some parts omitted, showing the mid-portion of the wheel in the position the several parts of the wheel would assume if the wheel were sustaining a load.
Figure 2:
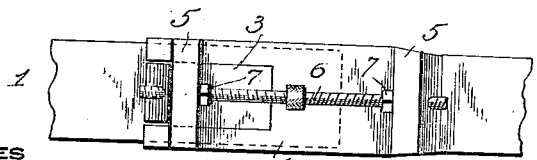
Fig. 2 is a detail view of a coupling for joining the adjacent ends of the rim together.

Referring to the drawings, there is shown a rim 1 and a central hub portion 2, the latter being of relatively large diameter. The rim 1 has telescoping ends 3, 4 with lugs 5 joined by a screw bar 6 provided with lock nuts 7 whereby the adjacent ends of the rim may be joined together and the rim contracted sufficiently to hold the parts in place.

The hub portion is made up of numerous segments 8 with radial ribs 9 by means of which the segments may be joined together in a circular series. Each segment is provided with a radial channel 10 having a deeper central channel 11 provided at the inner end with an enlargement 12 constituting a receptacle for a buffer 13 which may be made of leather or other soft material. At the other end of the channel 11, this being at the outer or wider end of the segment 8, the channel is broadened into a socket or receptacle 13$^a$. The shallow portion 10 of the channel is narrowed in conformity with the narrowing shape of the segment 8, and seated in the shallow portion of the channel 10 is a cover plate 14, the reverse or inner face of which is indicated in Fig. 7 with respect to the showing of Fig. 8. At what constitutes the outer end of the cover plate 14 is a cavity 15 matching and completing the receptacle 13$^a$.

Seated in each segment 8 is a block or holder 16 carrying series of anti-friction devices 17 which may consist of anti-friction balls, although other forms of anti-friction devices may be used. The plate 14 also carries a series of anti-friction balls 18 coacting with the balls 17 in the holder 16. The plate 14 is secured to the segment 8 by means of screws 19, or in any other appropriate manner, so that the series of balls 17 constitute a runway and guide for a spoke 20 which may be of square cross section, as indicated in Figs. 3, 6 and 9. Each spoke 20 has its outer end provided with a laterally extended head 21 with a shallow socket 22 in the face towards the body of the spoke, while on the opposite side of the head are spaced ears 23 with perforations 24 to receive between the ears one end of a link 25 held in place by a screw pin 26. The other end of each link enters between a pair of ears 27 formed on the inner circumference of the rim 1 at appropriate points, being held in place by a screw pin 28. Each link 25 has an arc-shaped shield 29 thereon to cover the outer ends of the ears 27.

Surrounding each spoke 20 between the head 21 and the outer edge of the corresponding segment 8 is a spring 30 having the ends seated in the respective cavities 13 and 22, thereby centralizing the springs with respect to the portions of the spokes surrounded thereby, such portions of the spokes being rounded as indicated at 20ª. The portion of each plate 14 containing the balls 18 is bulged as shown at 31.

If it be assumed that the hub portion 2 of the wheel be sustaining a load, the center of the hub will be eccentric to that of the rim 1, with the springs 20 of the lowermost spokes compressed somewhat similar to the showing of Fig. 1. The higher spokes adjacent to the lowermost spokes will also have their springs compressed, although to a less degree than said lowermost spokes. This compression of the spokes without bending or breaking them or putting them under undue strain is permitted by the interposition of the links 25 of the respective spokes. This change in relation of the spokes to the parts of the rim 1 to which the links are connected is taken care of by the flexibility of the link connections, wherefore the parts are not bent or distorted. The higher spokes move out of their guides in the hub portion to a greater extent than others of the spokes, the higher springs expanding correspondingly, it being understood that all the springs are under normal compression. In this manner, as the wheel revolves, the spokes constantly accommodate themselves to the changing relations and the support of the load is always of a yielding nature, imparting to the body of the vehicle an elastic floating effect similar to that obtained by pneumatic tires.

The rim expanding and contracting means shown in detail in Fig. 4 is provided in part to make assembling and disassembling of the wheel easier and in part for the purpose of adjusting the periphery of the wheel with relation to the spokes and link connections.

It will be understood that because of the links which connect the spokes with the rim, the rim must have some adjustability to bring all the links into alinement with their spokes during the assembling of the wheel.

What is claimed is:

1. A resilient wheel including a hub portion, channels radially disposed in the hub, a deeper central channel provided in each radial channel, means for holding a buffer at the inner end of the deep channel, a block carrying anti-friction devices received within the deep channel and held therein, a cover plate fitting into the shallow channel and carrying anti-friction devices, a spoke slidably received within each deep channel and within the block made polygonal in form whereby turning of the spoke on its axis is prevented, a rim to which the spokes are connected, and cushioning means between the hub and said rim.

2. A resilient wheel including a hub portion provided with a series of radial channels, a deeper central channel provided in each radial channel, a block carrying anti-friction devices received within the deep channel and held therein, a spoke slidably received within each deep channel and within the block made polygonal in form whereby turning of the spoke on its axis is prevented, a rim to which the spokes are connected, and cushioning means between the hub and said rim.

3. A resilient wheel including a hub portion provided with a series of radial channels, a deeper channel provided in each radial channel, a block carrying anti-friction devices received within the deeper channel and held therein, a cover plate fitting into the shallow channel and carrying anti-friction devices, a spoke slidably received within each channel, a rim to which the spokes are connected, and cushioning means.

4. A resilient wheel comprising a rim, links each pivotally connected at one end to the rim, an arcuate guard on each link for engagement with the inner face of the rim when the link is moved about its pivot, a spoke for each link pivotally connected to the inner end thereof, a hub having radial sockets for receiving the spokes, and a spring for each spoke surrounding the latter and placed between the hub and the corresponding link.

5. A resilient wheel comprising a rim with pairs of ears on its inner face having the inner ends of the ears curved about a center within the confines of the ears, links each pivoted at one end to the center about which the ends of the ears are curved and each link having an arcuate guard thereon conforming to the curvature of the respective pair of ears, a spoke for each link pivoted to the end thereof remote from the respective pair of ears, a hub having radial sockets for receiving the spokes, and a spring for each spoke surrounding the latter between the hub and a corresponding link.

6. A resilient wheel comprising a rim, a hub portion having radial sockets therein opening out at the periphery, each socket having anti-friction devices therein, spokes partly received within the sockets and having polygonal portions against which the said anti-friction devices bear whereby turning of the spokes on their axes is prevented, and cushioning means surrounding the spokes outside the hub portion.

In testimony, that I claim the foregoing as my own, I have hereto affixed my signature.

LOUIS EDWARD LEMLEY.